March 15, 1949.　　K. RATH　　2,464,527
PHOTOGRAPHIC EXPOSURE METER HAVING
ADJUSTABLE STAGGERED SCALES
Filed Nov. 3, 1944
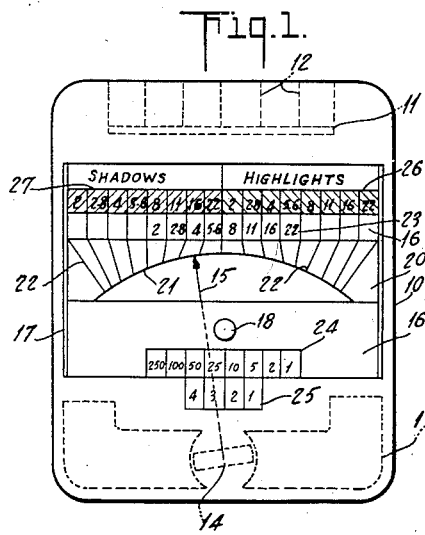
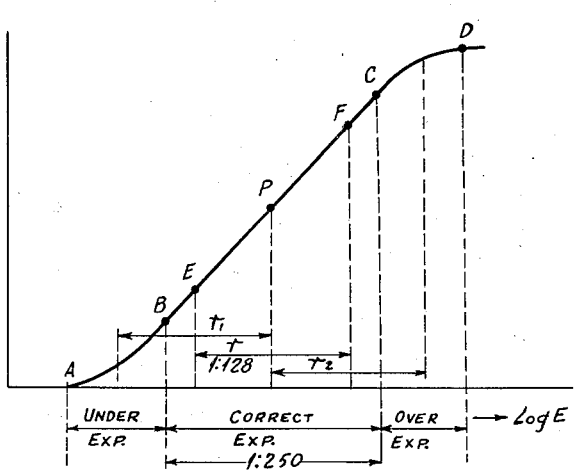
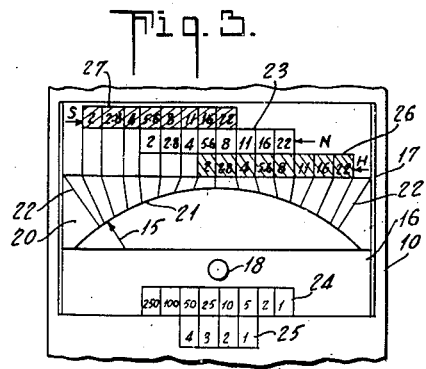
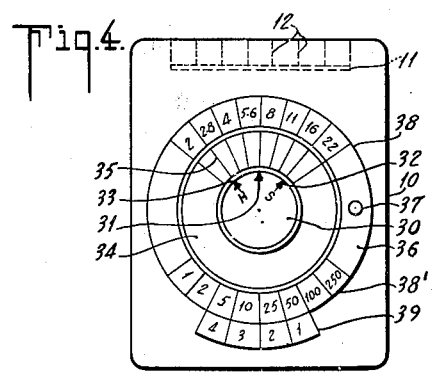
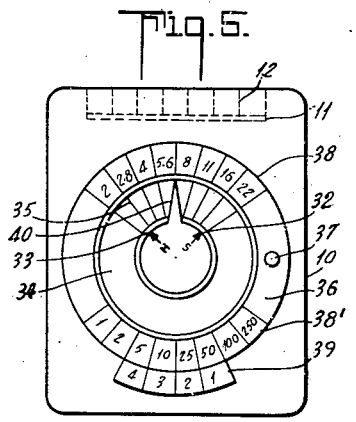
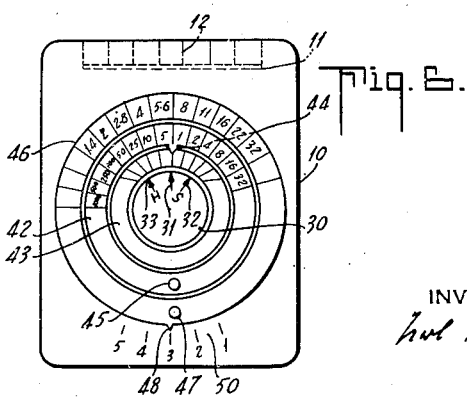
INVENTOR Patented Mar. 15, 1949

2,464,527

UNITED STATES PATENT OFFICE 2,464,527

PHOTOGRAPHIC EXPOSURE METER HAVING ADJUSTABLE STAGGERED SCALES

Karl Rath, New York, N. Y.

Application November 3, 1944, Serial No. 561,659

4 Claims. (Cl. 88—23)

The present invention relates to photographic exposure meters using a photoelectric cell as a light sensitive element connected to an electric indicator, more particularly to meters of the type wherein the deflection of the indicator needle or pointer is physically correlated with one or more exposure indicating scales, to enable a conversion into or interpretation of a scene or subject brightness indicated in terms of exposure adjustment of a camera.

According to one type of meter of this character known as direct reading meter, pre-setting or adjustment of the meter scales in accordance with a given film speed and one of the correlated main exposure controlling factors, viz., f-stop or lens speed and exposure time or shutter speed, will enable a direct reading of the co-ordinated exposure control factor, upon properly aiming the meter towards the scene or subject to be photographed, substantially without further manipulation or adjustment, in such a manner as to afford an instant and direct indication of the required exposure adjustment.

In another type of exposure meter known, one of a pair of cooperating scale members provided with f-stop and exposure time scales is set relative to the other scale member in accordance with the deflection of the meter or subject brightness, whereby to properly align both said scales and to enable the photographer to select any desired pair of coordinated stop and exposure time values to suit existing conditions and requirements.

The first mentioned or direct reading type of exposure meter is preferred by many amateurs and photographers accustomed to work with a fixed shutter speed whenever possible, sufficient to prevent the effect of camera movement or blurring of the picture, say about 1/25 or 1/50 sec., and to control the lens speed or f-stop in accordance with the prevailing scene or object brightness. By using a direct reading meter, once the meter has been set in advance for a desired film and shutter speed, no further adjustments are required as long as the same film and shutter speed are retained. In the special and rare cases where a definite stop is required or when photographing extremely fast moving objects, the meter may be easily reset to suit requirements of this and other character in practice.

Other photographers, especially those interested in pictorial effects and pictures of artistic value prefer a meter of the second type mentioned, wherein a series of lens and shutter speeds is indicated in the adjusting position, although a separate manipulation is required for each exposure determination.

The results obtained with photoelectric exposure meters, if not used judiciously and with care and often after considerable experience, may be subject to substantial errors due, in the first place, to the fact that no single number may be given to define the speed of a film or plate and, in the second place, to the fact that meters of the average type which measure the total light received from the subject or scene to be photographed, such as those using a photovoltaic cell of the well-known selenium-on-iron type, measure the physical average or total integrated light received from said subject. On the other hand, what is actually needed to determine the exposure is the average brightness between the darkest and brightest areas of the subject, the brightness being independent of area as is understood. In other words, while the camera lens, if properly focused, separates the image into individual elemental areas of sharply defined brightness whereby to render the different objects visible to the eye, the meter integrates the total light emanating from all the subject areas.

This total light or integrated brightness indicated by the meter will be equal to the average brightness between the brightest and darkest areas only in those cases where the light and dark areas cover substantially equal percentages of the entire scene or subject field. This is normally the case with flat scenes and subjects having a limited brightness contrast or all parts of which are of similar pictorial value or interest. Examples of this are distant landscape views (excluding any sky), certain architectural views, groups of persons and simple portraits. In all these cases the total light indicated by the meter is substantially equal to the average brightness and may serve as a safe basis for the exposure determination.

On the other hand, if the dark and bright tones or areas are not uniformly distributed over the scene or subject field, such as is the case with scenes of extreme brightness contrast or scenes including an object or portion of predominant pictorial interest to be rendered in the final print in preference to the remaining scene portions, then the total light measured by the meter may deviate considerably from the average brightness which still determines the exposure to be given irrespective of the relative light and dark areas of the subject.

In cases of very flat scenes, the error in the brightness reading in the latter case may be compensated to some extent due to the latitude of the film, but with scenes of great brightness range or contrast, the error in the meter reading due to the light areas of a scene swamping the dark areas and vice versa will in most cases be sufficient to result in substantial under- or over-exposure of the negative or a complete loss of the picture.

Accordingly, an object of my invention is the provision of an improved photoelectric exposure meter which may be used and operated in a simple manner both on the basis of the total light indication as well as by exposing on the shadows or highlights to suit the nature or character of a scene or subject, substantially without special adjustments or manipulations required on the part of the photographer.

An ancillary object is to provide a meter of this type which can be used with equal advantage for both negative and reversal film or plate.

Another object is to provide a photographic exposure meter which is simple in construction and which will enable a selective reading of the required exposure with regard to the average, light or dark tones of a scene or subject, respectively, depending on the character of the subject and other conditions or requirements.

Another object is to provide a photographic exposure meter enabling the photographer selectively to expose on either the mid-point or the extreme shadow and highlight points of the characteristic H & D curve of the negative emulsion used in the camera.

Another object is to provide an exposure meter designed to enable the photographer selectively to fit the brightness range of a subject or scene to be photographed to coincide with the central or the extreme sections, respectively, of the characteristic H & D curve of the film or plate used, depending on the relative bright and dark areas and other characteristics of the subject or scene to be photographed.

A more specific object is to provide an exposure meter which will enable either a normal reading or selective reading of the required exposure setting of one of the camera controls upon pre-setting of another control, wherein normal exposure is defined as one where the mid-brightness of the subject is located in the middle of the characteristic H & D curve of a plate or film used and the highest and darkest brightness are the same distance away from this mid-point, and selective exposure is one where a specific subject brightness such as the darkest brightness or shadows and highlights fall on a selected point of the H & D curve such as the lower and upper ends, respectively, of the straight part of the usable portion between the toe and threshold section of the curve.

Another object is to enable the photographer to selectively read correct or minimum correct exposure, the former being based on measuring the mid-subject brightness and the latter being based on the measurement of the darkest shadow and brightest highlight portions and their placing upon the corresponding points of the H & D curve of a film or plate used.

With these and other objects in view, as will appear from the following description, the invention involves generally the provision of additional scale and/or indicating means in connection with exposure meters of the type referred to, whereby the photographer will be enabled selectively to obtain a reading based either on the average or mid-brightness of the scene or subject to be photographed or upon the darkest or the brightest areas, respectively, which it is desired to render correctly in the final print.

Other objects and novel aspects of the invention will become more apparent from the following detailed description taken in reference to the accompanying drawing forming part of this specification and wherein:

Figure 1 is a top view of an exposure meter embodying the principles of the invention;

Figure 2 shows a known H & D characteristic curve of a photographic film or plate explanatory of the function operation of the invention;

Figure 3 is a fragmentary view similar to Figure 1 and illustrating a modification thereof;

Figures 4 and 5 are diagrammatic views illustrating further exemplifications of exposure meters according to the preceding illustrations; and Figure 6 illustrates a different type of exposure meter embodying the principles of the invention.

Like reference characters identify like parts throughout the different views of the drawing.

Referring more particularly to Figure 1, I have shown a flat rectangular casing 10 of any suitable material such as Bakelite or other composition material and including a photoelectric cell 11 of the selenium-on-iron or oxide-on-copper type known in the art and mounted behind a light admitting opening in the front wall of the casing 10. There is also shown a light baffle 12 in front of the photoelectric cell 11 of any suitable type such as a grille or multi-cellular baffle as indicated in the drawing to restrict the view or acceptance angle of the meter to a value equal to the field angle of a photographic camera, i. e., about 50° for the standard still camera and 25° for the standard motion picture camera. Thus, by aiming the meter with the cell 11 pointed in the direction of the subject of scene to be photographed, only light that emanates from said subject will affect the sensitive surface and cause a corresponding electric current to be generated by the cell.

This current serves to energize a sensitive indicator or microammeter, preferably of the permanent magnet type having a magnet core 13 provided with an air gap wherein is mounted a moving coil 14 carrying an indicating needle or pointer 15 in a manner well known to those skilled in the art. In order to cover a substantial range of scene and subject brightness values without a separate sensitivity adjustment, the meter deflection is preferably logarithmic or semi-logarithmic by the proper design of the air gap to become wider as the exciting current increases or by the inclusion of a fixed resistance in series with the cell (not shown) which latter has the effect of changing the normally linear characteristic of the pointer deflection as a function of the exciting current to a substantially logarithmic relation.

The light values indicated by the deflection of the pointer 15 are converted into terms of appropriate exposure control by means of a direct reading adjustable scale arrangement comprising, in the example shown, a strip-like scale member 16 passing through suitable slots 17 in the top wall of the casing 10 and being displaceable in its lengthwise direction by the aid of an adjusting knob 18 or in any other suitable manner. Scale member 16 may be an endless ribbon and is suitably guided within the casing by slots, rollers, etc., as will be readily understood.

Scale member 16 is provided with a central longitudinal opening or slot 20 to reveal a fixed dial or plate provided with an arcuate scale 21 for the pointer 15 and guide or lead lines 22 connecting scale 21 with a scale 23 on the upper part of the member 16 in the manner shown. Guide lines 22 serve in a known manner to correlate the circular scale 21 which may have a non-linear scale division with the equally or linearly spaced scale divisions of scale 23. If the meter scale were truly logarithmic, the guide lines could be omitted, as shown in the embodiments according to Figures 4 and 5.

In the example illustrated, the scale 23 constituting the normal indicating scale of the meter represents lens speed or f-stop values, from f.2 to f.22 in the example illustrated. Similarly, the lower part of scale member 16 on the opposite side of the slot 20 is provided with a scale 24 representing shutter speeds or exposure times, from 1 sec. to $\frac{1}{250}$ sec. in the example shown, and arranged adjacent and in cooperative relation to a fixed or stationary scale 25 upon the top wall of the casing and representing film speed values in any known or arbitrary units 1 to 4 as shown. The latter are such that every successive number corresponds to twice or half the preceding film speed or sensitivity.

In a meter of this type, adjustment of scale member 16 by the aid of knob 18 to a point where the speed of the film used and shown on scale 25 is opposite a chosen shutter speed, such as $\frac{1}{25}$ sec. for a film having an arbitrary speed number 3 as shown in the example illustrated, will enable a direct reading of the necessary lens speed or f-stop by following the end of pointer 15 along the adjacent lead line 22 to the scale 23. In the example shown, the stop indicated is f.4 and to this value the camera should be adjusted to obtain a correctly exposed picture. As is seen, no further adjustment or manipulation is required for operating the meter as long as the same film and shutter speed are retained.

As is understood, scales 23 and 24 may be interchanged, whereby a desired stop may be selected in advance and the meter in this case directly indicates the required shutter speed. However, the pre-selection of the exposure time is to be preferred to prevent camera movement under all circumstances and to enable the meter to be used with both still and motion picture cameras. In the latter case, the shutter speed scale 24 is replaced by a corresponding scale representing frames per sec.

In the afore-described operation, the meter should be aimed towards the scene or subject so as to encompass the subject field only and to prevent light from outside objects or the sky to modify the light reading and cause wrong exposures. As pointed out, such a meter measures the total light from the subject which is equal to the average brightness determinative of the exposure only in such cases where the bright and dark areas are equally distributed over the subject area. In all other cases, the meter reading measuring the total light depends on the relative bright and dark areas of the subject and may result in substantial exposure errors.

The design of the meter under these conditions is such that the exposure E corresponding to the meter reading coincides with a point P at about the middle of the density-log E or H & D curve of the film or negative emulsion used, as shown in Figure 2. In the latter, the abscissae represent in a known manner the logarithm of exposure E in suitable units such as lux-seconds and the ordinates represent the blackening or density D of the film for a given standard development. The curve shown comprises the well known toe section A—B or region of under-exposure, the straight-line section B—C or region of correct exposure and the shoulder section C—D or region of over-exposure. In a practical example, the under-exposure section A—B may comprise a range of $\frac{1}{64}$ to $\frac{1}{4}$ lux-sec., the straight section a range of $\frac{1}{4}$ to 64 lux-sec. corresponding to an exposure latitude of 1:250, and the over-exposure section may comprise a range of from 64 to 500 lux-sec.

By designing the meter so as to base or anchor the exposure upon point P in the middle of the "straight" B—C of the curve corresponding to about 4 lux-sec. in the example mentioned, i. e., by so selecting the stop in each case, that the exposure equals 4 lux-sec., the subject brightness range may be fitted or accommodated within the "straight" of the emulsion characteristic. This is practically always possible, since the maximum scene brightness range for the majority of photographic subjects never exceeds the exposure range or latitude of the average photographic emulsion. However, it is seen from this that the greater the subject brightness range, the more correct the exposure has to be and in cases of extreme subject contrast there will be only a single correct exposure or the film latitude reduced to zero. In this case, the accuracy and reliability of the meter are of great importance in order to insure a correctly exposed picture.

Thus, in the example of Figure 1, assuming a maximum subject brightness range of 1:128 with the mid or average scene brightness based upon the point P of the curve, then the darkest and lightest tones corresponding to points E and F, respectively, will be sufficiently spaced from points P and C representing the beginning of the under- and over-exposure regions. With a film having a latitude of only 1:128, the darkest and lightest tones will coincide with the points P and C or just fit the straight portion of the curve.

The above, however, is correct only if the total or average light measured by the meter is identical with the average brightness, i. e., if the bright and dark tones cover the same relative areas of the entire subject field. If, on the other hand, the highlights predominate and the same procedure is followed as outlined, by measuring the total light from the subject, then the point P will no longer correspond to the average brightness and the entire brightness range will be shifted towards the left, as indicated at $r_1$ in the extreme case, resulting in considerable underexposure. This may be of a serious character in cases of contrasty scenes or when using a film of limited latitude and a high development contrast (gamma).

Similarly, if the dark tones predominate and swamp the bright tones, point P will coincide with a lower tone of the subject, resulting in a shift of the scene brightness range towards the right as shown at $r_2$ and resulting in over-exposure as is understood.

It is obvious, therefore, that the main cause of most uncertainties and difficulties in the practice of using exposure meters is due to the fact that the meter indicates the average brightness of the whole subject, while the exposure should be based on the average brightness between the brightest and darkest tones only which is independent of area.

The present invention provides a means for making the average type of meter a more valuable instrument instead of a trap for the unwary as will be more clearly described in the following.

Taking for granted the fact that the light baffle is properly constructed so that the meter accepts light only from within a definite angle, one proceeds to measure not the average light from the whole subject but that from some small selected part of it representing a deep typical shadow or highlight according as one is working negative or reversal. This procedure may be followed by moving right up to the subject till only the part required is covered by the meter's acceptance angle.

A simple method for testing the deepest shadows is based on the fact that as one approaches nearer to the subject, other and brighter objects are successively cut out of the field of view and hence the meter reading will go down and down. When a still nearer approach gives no further drop in reading, one knows that the whole field of view of the meter is now full of the shadow area. Exactly similar conditions apply to highlight testing, except of course that it is maximum and not minimum reading that we look for.

Furthermore, it is easier to achieve good print quality when the negatives are accurately exposed. By good print quality is usually meant brilliant appearance, gradation of tones and luminous highlights and transparent shadows. Unnecessary negative density degrades an enlargement due to scattering of light rays by the grain of film in the image of the negative, in addition to requiring exceedingly long exposure times. For this and other reasons, exposure on the shadows in case of negative work rather than on the average brightness may be advantageous and preferable in many cases in practice.

According to the present invention, means are provided in the form of auxiliary scale and/or indicating means, whereby to enable the photographer to effect an exposure reading or determination based on either the average subject brightness for normal scenes or subjects or based on either the shadows or highlights, substantially without any additional adjustments, reading and transfer of numbers or other manipulations. In other words, the invention provides a meter which may be used selectively for either normal or minimum correct exposure without additional adjustment or operation, normal exposure being one based on the mid-point of the H & D curve and minimum correct exposure being based on a point a predetermined distance from said mid-point and preferably coinciding with the extreme end of the useful straight line portion of the curve. In this manner, the photographer is enabled to decide instantly on the best procedure to be followed in accordance with the nature and the character of the subject and existing conditions or requirements.

In the embodiment of the invention shown in Figure 1, there are provided two additional indicating scales 26 and 27 on the upper part of the scale member 16, said scales being adjacent to and relatively displaced with respect to the main scale 23 and corresponding to exposure readings based on the highlight or shadow areas, respectively, in the manner understood from the foregoing. In taking a reading on scales 26 and 27 one merely follows the end of pointer 15 along the lead lines 22, fully ignoring scale 23.

In the example illustrated, a film having an exposure range or latitude 1:250 has been assumed as shown in Figure 1 and the relative position of scales 23, 26 and 27 is such that scale 23 will give a correct reading when measuring the total light from the subject with the exposure based upon point P in the middle of the straight portion B—C of the curve, while the scales 26 and 27 will give a correct reading when measuring the light from the highest or darkest areas, respectively, corresponding to an exposure located at a distance of 4 log E units, or a 1:16 brightness difference, from mid-point P of the curve.

In other words, the displacement in scale units of the staggered scales 23, 26 and 27 which in accordance with known practice and as shown in the drawing are of logarithmic character, should be of the order of about one half of the usual exposure range in logarithmic units, i. e. 4 scale units in the case of Figure 1, corresponding to the assumed exposure range 1:250 or 8 log units.

The emulsion latitude in practice may be less than assumed, in which case a certain part of the toe and shoulders sections of the curve may be used to advantage without seriously affecting the final print. Thus, if the emulsion latitude is assumed to be 1:128, i. e., 7 instead of 8 log units, the shadow or highlight points may then be chosen at a distance differing by a ratio 1:12 from the middle or point P of the curve, as has been assumed in the modifications according to Figures 4 and 5 to be described presently.

The above applies of course to subjects of relatively high contrast. Since the brightness contrast of the average subject in which the majority of persons is interested in substantially less than this maximum, it is possible to use the average adjustment or scale 23 in the majority of cases, including those where it is physically impossible to approach the subject closely, and to resort to scales 26 and 27 in doubtful cases or when more reliable results are desired, such as in the case of unusually contrasty scenes. On the other hand, the photographer may desire to base most of his exposures on the darkest shadows in the interest of obtaining easily printable negatives of low density or for any other reasons.

There are many other cases and subjects which make it desirable for the more experienced photographer to selectively base the exposure on different portions of the emulsion curve. Thus, if the subject consists mainly of relatively bright areas such as cloud scenes or in case of highly illuminated portraits with unimportant background, a reading taken on scale 26 may be preferable to an average reading to obtain a print of improved qualities.

From the foregoing it is seen that there is provided by the invention a simple and easily readily exposure meter enabling the subject brightness range to be fitted to different sections of the emulsion curve, preferably the center and extreme sections of the curve, substantially without additional adjustments or manipulations and in such a manner as to afford an instantaneous selection of the best procedure to be followed, depending on the character or nature of the subject or special conditions and effects to be obtained in the final print.

Figure 3 shows a modification of the invention, wherein the shadow and highlight scales 27 and 26 identified by the letters S and H are arranged on opposite sides of the normal indicating scale 23 marked by the letter N, the remainder of the meter and its operation being substantially the same as described hereinbefore. In Figure 3, a somewhat lower exposure range of 1:128 or 7 log units has been assumed, resulting in a displacement of staggered scales 23, 26 and 29 by only about 3 scale divisions, i. e. one half of the logarithmic exposure range of the emulsion.

Referring to Figure 4. I have shown diagrammatically a further embodiment of an exposure meter constructed in accordance with the invention. In this modification, the moving coil of the microammeter (not shown) carries a small disc 30 secured to its shaft at right angle thereto, whereby said disc will be rotated about its axis in accordance with the subject brightness in a manner well understood. In the example illustrated, the response of the meter is assumed to be logarithmic so that equal percentage brightness changes will result in equal angular rotation of the disc 30 or equal deflection of the three spaced indicating marks 31, 32 and 33 provided for readings to be taken on the average, the shadow or highlight subject brightness, respectively, and arranged to cooperate with an adjustable indicating scale member 36 by way of guide lines 35 applied to a fixed ring-shaped plate 34. Scale member 36 having an adjusting knob 37 carries a first scale 38 representing f-stops and a further scale 38' representing shutter speeds, the latter being arranged to cooperate with a fixed film speed scale 39.

In operation, after adjustment of a selected shutter speed for a given film or plate speed, the average, shadow or highlight readings may be taken by employing the corresponding index 31, 32 and 33 in a manner readily understood from the above.

Figure 5 differs from Figure 4 merely by the design of the normal or main index 40 in the form of a pointer integral with or secured to the rotating disc and extending close to the scale 38.

In Figures 4 and 5, an emulsion latitude of 1:128 has been assumed with the S and H points equally spaced from the midpoint P of the curve by distances corresponding to exposure ratios 1:12 or coinciding with the end points of the straight portion of the curve. If the film has a greater latitude, the shadow and highlight points will be spaced from the extreme ends of the straight section (see points E and F in Figure 2). If the film has a lesser latitude, such as when developed to a relatively high gamma, the subject brightness range may extend somewhat into the useful toe and threshold sections without affecting the quality of the negative.

Referring to Figure 6, there is shown diagrammatically a different type of known exposure meter embodying the principles of the invention. Disc 30 carrying multiple index marks 31, 32 and 33 is rotated by the galvanometer moving coil in the same manner as described in connection with Figures 4 and 5 and cooperates with a first circular adjustable scale 42 calibrated in shutter speeds by way of lead lines applied to a ring shaped member 43. Scale member 42 has an index 44 and an adjusting knob 45 to enable the same to be adjusted in accordance with any of the marks 31, 32 and 33 on the disc 30. A further ring-shaped scale member 46 carrying a lens speed scale cooperates with the shutter speed scale of member 42 and may be adjusted by means of a knob 47 and index 48 in accordance with a given film speed on fixed scale 50.

In operation, after the meter has been set in accordance with the film or plate speed number by the adjustment of scale member 46, adjustment of scale member 42 to a point where the index 44 coincides with the respective index mark 31, 32 and 33 on the disc 30 will result in a proper relative alignment of the lens and shutter speed scales so that any desired coordinated pair of lens and shutter speed values may be subsequently selected for the adjustment of the camera controls.

Concerning the designation of film speed or emulsion sensitivity in an exposure control system as proposed by this invention, it is possible to use any of the known systems, such as the well-known Scheiner system, and to calibrate the film speed scales in suitable numbers according to the system chosen.

A more appropriate and correct system, however, for use in connection with the present invention consists of a film speed scale with arbitrary numbers, say, from 1 to 16, and assigning corresponding numbers to the popular films commercially available, in such manner as to properly correlate the exposure adjustment with the mid-point or extreme points of the respective emulsion characteristics, in the manner proposed by the invention.

Photographic emulsions at present known require from about 1/100 to 1/8 lux sec. for "minimum correct" exposure, and following a definite development technique and developing to a predetermined contrast or gamma, as recommended by the manufacturers, the "minimum correct" exposure can be easily determined from the H & D curves also available in most cases, and the corresponding arbitrary speed number assigned to each film or plate. Thus, in the example shown, speed numbers 1 to 16 would correspond to films with minimum exposures from 1/100 to 1/8 lux sec., whereby every four scale unit will represent a doubling or halving of the exposure.

In this manner, provided a given development technique is followed in all cases, accurate film speed consideration will be enabled by the use of the "minimum correct" exposure as a basis. Since all films have been found to have an average exposure range or length of the useful straight section of their H & D curve of about 1:128, the location of the mid-point for average exposure, and of the upper and lower points for "correct minimum" exposure, can be easily coordinated with the position of the corresponding adjusting marks on the meter scale for practically any emulsion available, as will be readily understood.

While I have shown and described in the foregoing several desirable embodiments of my invention, it is understood that this disclosure is for the purpose of illustration and that various changes in shape, proportion and arrangement of parts, as well as the substitution of equivalent elements and materials for those herein shown and described, may be made without departing from the spirit and scope of the invention as set forth in the appended claims. The specification and drawing are accordingly to be regarded in an illustrative rather than a restrictive sense.

I claim:

1. In a photographic exposure meter for determining the correlated lens aperture and exposure time adjusting values for emulsions having a useful exposure range of a given number of logarithmic exposure units, a light meter comprising a photoelectric device and a current indicator having a pointer and being electrically connected to said device, an adjustable scale member provided with a plurality of relatively staggered logarithmic scales covering identical ranges of one of said adjusting values, said staggered scales being arranged for simultaneous cooperation with said pointer and displaced by distances equal in number of scale divisions to about one half the logarithmic units of said exposure range, a further scale upon said member representing the other of said adjusting values, and at least one stationary index adjacent to and arranged to cooperate with said last mentioned scale.

2. In a photographic exposure meter for determining the correlated lens aperture and exposure time adjusting values for emulsions of varying sensitivity and having a useful exposure range of a given number of logarithmic exposure units, a light meter comprising a photoelectric device and a current indicator having a pointer and being electrically connected to said device, an adjustable scale member provided with a plurality of relatively staggered logarithmic scales covering identical ranges of one of said adjusting values, said staggered scales being arranged for simultaneous cooperation with said pointer and displaced by distances equal in number of scale divisions to about one half the logarithmic units of said exposure range, a further scale upon said member representing the other of said adjusting values, and a stationary scale calibrated in emulsion sensitivity values and arranged for cooperation with said last mentioned scale.

3. In a photographic exposure meter for determining lens apertures for a given exposure time and emulsions having a useful exposure range covering a predetermined number of logarithmic exposure units, a light meter comprising a photoelectric device and a current indicator having a pointer and electrically connected to said device, an adjustable scale member provided with a plurality of relatively staggered logarithmic scales covering identical lens aperture ranges, said staggered scales being arranged for simultaneous cooperation with said pointer and being displaced by distances equal in number of scale divisions to about one half the number of logarithmic units of said exposure range, a further scale upon said member representing exposure times, and at least one stationary index adjacent to and arranged to cooperate with said last mentioned scale.

4. In a photographic exposure meter for determining the apertures for a given exposure time and emulsions of varying sensitivity and having a useful exposure range covering a predetermined number of logarithmic exposure units, a light meter comprising a photoelectric device and a current indicator having a pointer and electrically connected to said device, an adjustable scale member provided with a plurality of relatively staggered logarithmic scales covering identical lens aperture ranges, said staggered scales being arranged for simultaneous cooperation with said pointer and being displaced by distances equal in number of scale divisions to about one-half the number of logarithmic units of said exposure range, a further scale upon said member representing exposure times, and a stationary scale calibrated in emulsion sensitivity values and arranged for cooperation with said exposure time scale.

KARL RATH.

REFERENCES CITED

The following references are of record in the file of this patent:

UNITED STATES PATENTS

| Number | Name | Date |
|---|---|---|
| 2,070,664 | Kuppenbender | Feb. 16, 1937 |
| 2,073,790 | Goodwin | Mar. 16, 1937 |
| 2,203,209 | Weston | June 4, 1940 |
| 2,247,763 | Meyers | July 1, 1941 |
| 2,285,761 | Tonnies | June 9, 1942 |

FOREIGN PATENTS

| Number | Country | Date |
|---|---|---|
| 445,960 | Great Britain | Apr. 22, 1936 |
| 490,464 | Great Britain | Aug. 12, 1938 |